(12) United States Patent
Sribhashyam et al.

(10) Patent No.: US 10,921,018 B2
(45) Date of Patent: Feb. 16, 2021

(54) SELF-SEALING VENT ASSEMBLY (71) Applicant: Sashrik Sribhashyam, San Jose, CA (US)

(72) Inventors: Sashrik Sribhashyam, San Jose, CA (US); James Nadir, San Jose, CA (US)

(*) Notice: Subject to any disclaimer, the term of this patent is extended or adjusted under 35 U.S.C. 154(b) by 173 days.

(21) Appl. No.: 16/167,112

(22) Filed: Oct. 22, 2018

(65) Prior Publication Data
US 2020/0124317 A1 Apr. 23, 2020

(51) Int. Cl.
| F24F 13/10 | (2006.01) |
| F24F 13/06 | (2006.01) |
| F24F 13/08 | (2006.01) |
| B01J 20/28 | (2006.01) |
| F24F 110/20 | (2018.01) |

(52) U.S. Cl.
CPC ......... *F24F 13/10* (2013.01); *B01J 20/28047* (2013.01); *F24F 13/06* (2013.01); *F24F 13/082* (2013.01); *B01J 2220/66* (2013.01); *F24F 2110/20* (2018.01)

(58) Field of Classification Search
CPC .......... F24F 13/10; F24F 13/06; F24F 13/082; B01J 20/28047; B01J 2220/66
USPC ....................................................... 454/339
See application file for complete search history.

(56) References Cited

U.S. PATENT DOCUMENTS

| 4,924,860 A | 5/1990 | Larsen et al. |
| 4,987,796 A | 1/1991 | Von Kaler et al. |
| 5,118,268 A | 6/1992 | Crisenbery et al. |
| 5,125,415 A | 6/1992 | Bell |
| 5,156,811 A | 10/1992 | White |
| 6,589,015 B1 | 7/2003 | Roberts et al. |
| 9,732,988 B1 | 8/2017 | Spero et al. |
| 9,889,651 B2 | 2/2018 | Norasak |
| 2004/0052689 A1 | 3/2004 | Yao |
| 2005/0171491 A1* | 8/2005 | Minh Miner ........ A61M 5/1411 604/257 |
| 2006/0248917 A1* | 11/2006 | Urfig ..................... F28D 20/023 62/420 |
| 2007/0039866 A1 | 2/2007 | Schroeder et al. |
| 2007/0141593 A1 | 6/2007 | Lee et al. |
| 2010/0209916 A1 | 8/2010 | Zon |
| 2014/0106661 A1* | 4/2014 | Baldwin ................. F24F 13/14 454/358 |
| 2016/0038936 A1 | 2/2016 | Ding et al. |
| 2016/0194702 A1 | 7/2016 | Schroeder et al. |
| 2019/0126234 A1* | 5/2019 | Flaugher ................ F21S 45/30 |

* cited by examiner

*Primary Examiner* — Steven B McAllister
*Assistant Examiner* — Charles R Brawner
(74) *Attorney, Agent, or Firm* — Schwegman Lundberg & Woessner, P.A.

(57) ABSTRACT

Example embodiments use hydrophilic substances to absorb moisture from the air passing through the vent cover. The vent cover is recommended to be used along with a fan to regulate the air flow through the vent cover. The vent cover has holes, and the holes are filled with the hydrophilic material (i.e., hydrogel or polyacrylamide beads). Once enough moisture from the air passes through the vent cover, the vent cover seals itself and prevents air from flowing. The hydrophilic material allows the water to evaporate over time and thus effectively removes the seal.

12 Claims, 9 Drawing Sheets

SELF-SEALING VENT ASSEMBLY

BACKGROUND

US Patent Application Number US2004/052689A1 to Li Yao (the "Yao application") describes gas- or liquid-permeable materials that seal when exposed to water and methods of making such materials. A described self-sealing material comprises a hydrogel adhered to pore walls of a porous substrate. The hydrogel is a polymer selected from the group consisting of hydrophilic polyurethane, hydrophilic polyurea, and hydrophilic polyurethane (e.g., a hydrophilic polyurethane). The described self-sealing vent is versatile but has trouble regulating the humidity of sensitive substances (i.e., hygroscopic chemicals) or withstanding high levels of pressure. Places close to water tend to have higher humidity and air pressure making this design highly ineffective in those areas.

U.S. Pat. Nos. 4,924,860, 5,125,415, and 5,156,811 disclose self-sealing materials made of a porous plastic filled with particles of a water-absorbable material such as cellulose.

BRIEF SUMMARY

Example embodiments use hydrophilic substances to absorb moisture from the air passing through the vent cover. The vent cover may be used along with a fan to regulate the air flow through the vent cover. The vent cover comprises a housing in which are defined a plurality of cavities or holes. The cavities are filled with the hydrophilic material (i.e., polyacrylamide beads). Once enough moisture from the air passes through the vent cover, the vent cover seals itself and prevents air from flowing. The hydrophilic material allows the water to evaporate over time and thus effectively removes the seal.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Description

Figure 1:
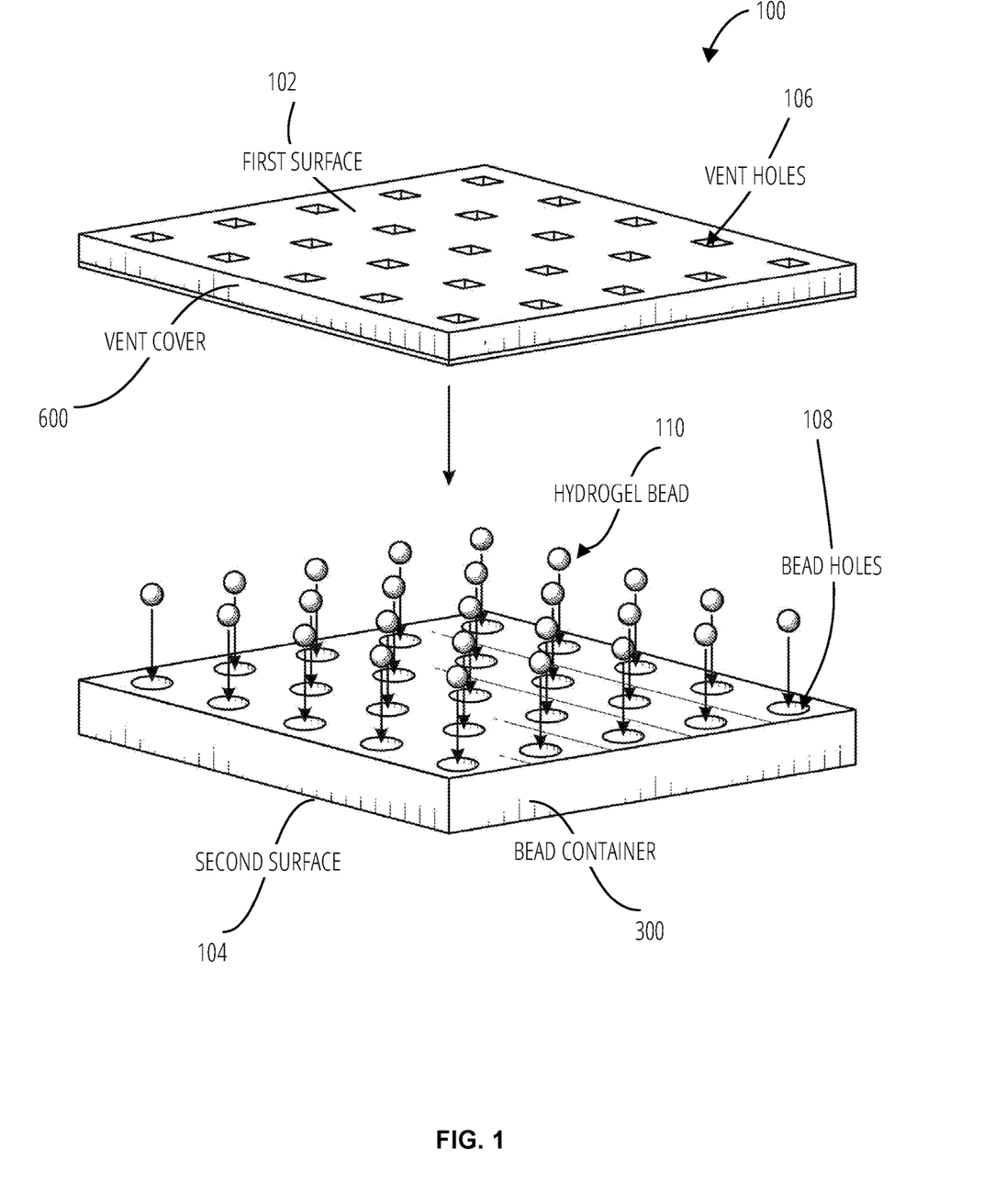
FIG. 1 illustrates a vent 100 in accordance with one embodiment.

FIG. 1 is an isometric view of a vent 100, according to an example embodiment, that comprises a housing having two housing components, namely a first housing component in the form of a vent cover 600 and a second housing component in the form of a bead container 300. An outer surface of the vent cover 600 provides an outer first surface 102 of the housing, and an outer surface of the bead container 300 provides an outer second surface 104 of the housing.

The vent cover 600 has a matrix of vent holes 106 defined therein, while the bead container 300 has a corresponding matrix of bead holes 108 defined therein. The vent cover 600 and the bead container 300 are secured to each other (e.g., by a glue or plastic welding) so that the respective vent holes 106 and bead holes 108 define a matrix of discrete passages through the housing that permits a fluid (e.g., liquid or gas), to flow through the housing from the first surface 102 to the second surface 104.

Each of the discrete passages defined by the vent holes 106 and bead holes 108 are defined and dimensioned to retain a hydrophilic substance, in the form of a hydrogel bead 110. A hydrogel bead 110 is placed in each of the bead holes 108 during the manufacturing process, prior to the securing of the vent cover 600 and the bead container 300 to define a composite housing. Operationally, each hydrogel bead 110 expands from a contracted state to an expanded state within a respective discrete passage, as a fluid (e.g., air) passes through the discrete passage and the hydrogel bead 110 absorbs moisture from the air. The hydrogel bead 110 is dimensioned to expand to fully occupy the horizontal internal dimension of the defined passage, so as to constrict the flow of the air through the respective discrete passage of the vent 100.

Figure 2:
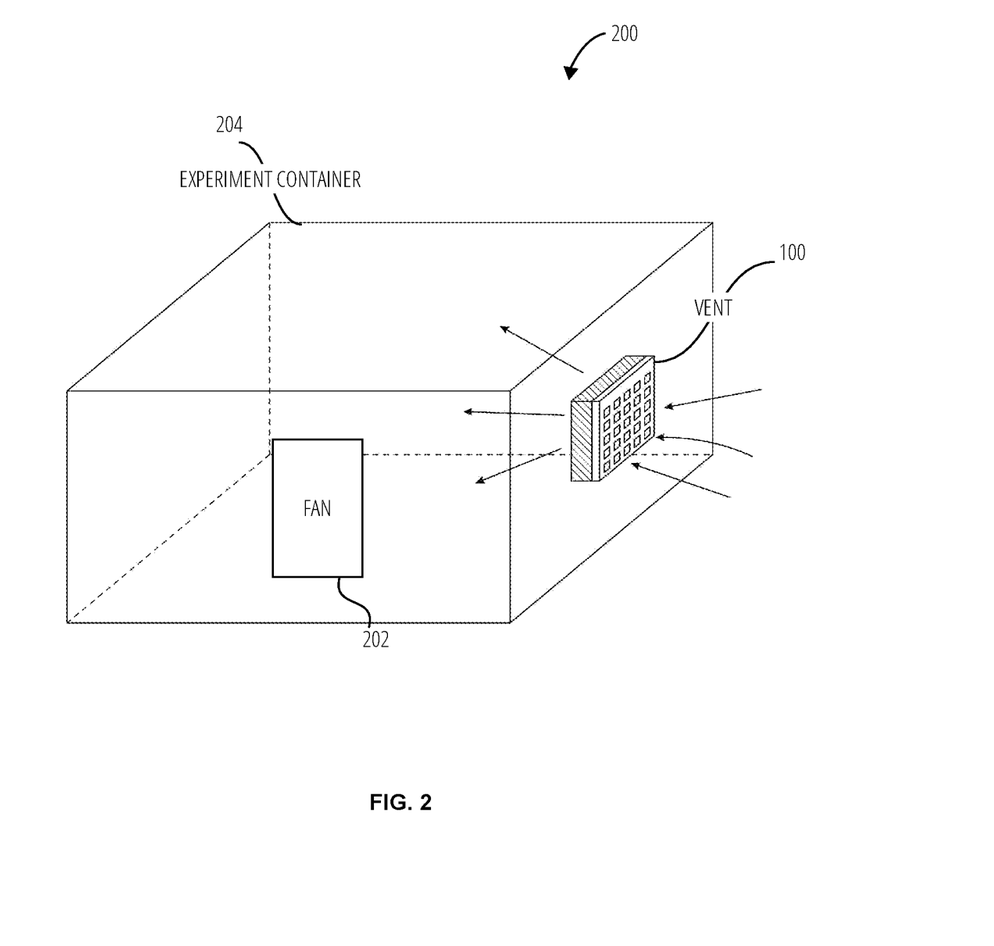
FIG. 2 illustrates an item 200 in accordance with one embodiment.

FIG. 2 is an isometric view of an experiment container 204 that includes the vent 100, according to one example embodiment. The vent 100 located in one wall of an experiment container 204, and another wall of the experiment container 204 secures a fan 202 which can operationally extract air from the interior volume of the experiment container 204 or alternatively push air into the interior volume of the experiment container 204. In the scenario depicted in FIG. 2, the fan 202 is operating to extract air from the interior of the experiment container 204, and air is accordingly shown to be drawn into the interior of the experiment container 204 through the discrete passages defined in the vent 100. As air passes from the outside first surface 102 of the vent 100 to the interior second surface of the vent 100, the hydrogen beads located in the discrete passages absorb moisture from the air and expand to seal each of the discrete passages. The container 204 could hold plant growth experiments or any other project involving the use of regulation of humidity. The container 204 could also hold chemicals that are hygroscopic (i.e., sodium hydroxide).

Figure 3:
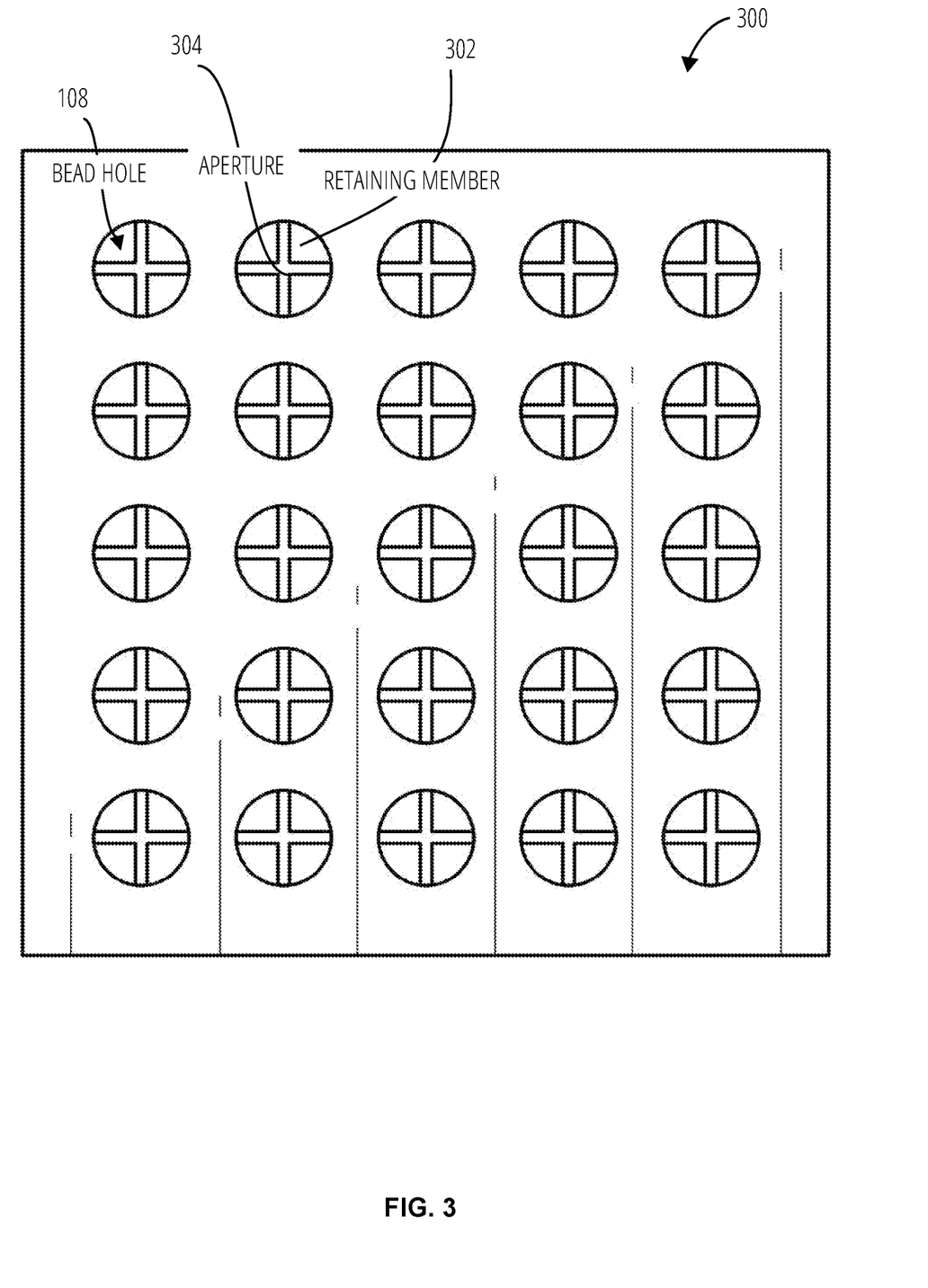
FIG. 3 illustrates a bead container 300 in accordance with one embodiment.
Figure 4:
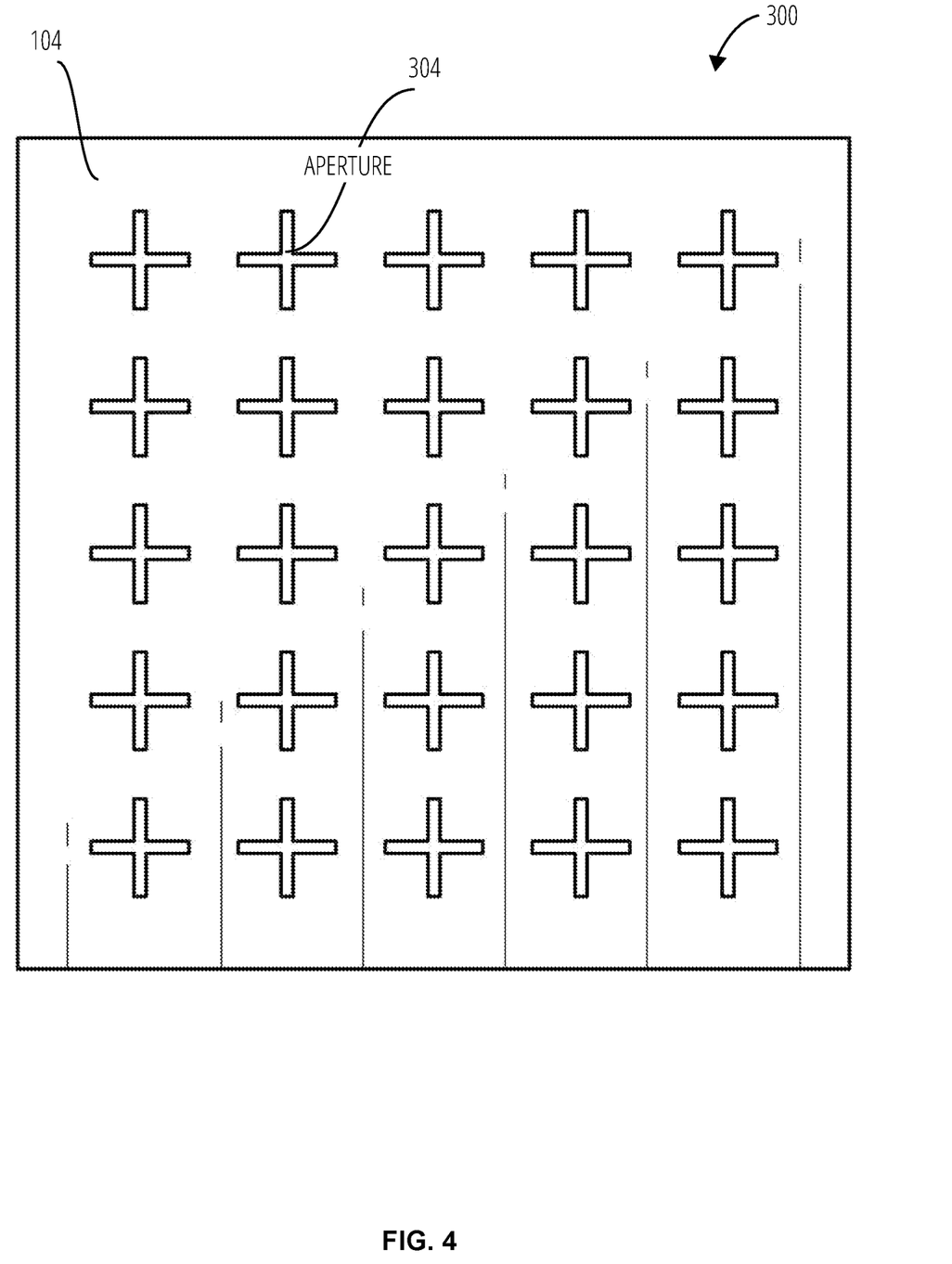
FIG. 4 illustrates a bead container 300 in accordance with one embodiment.
Figure 5:
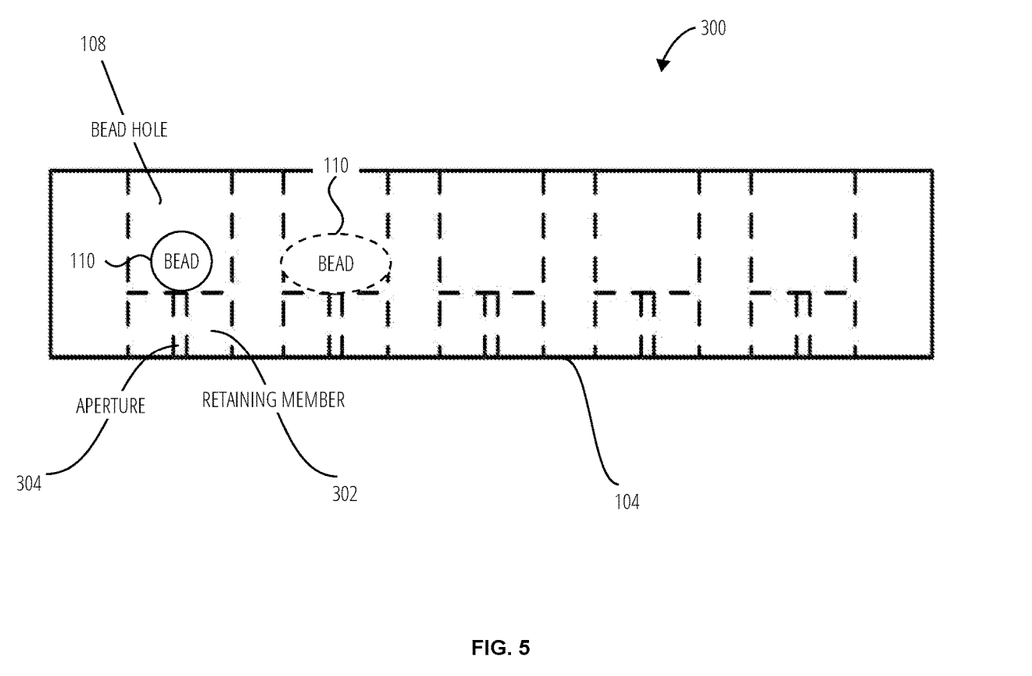
FIG. 5 illustrates a bead container 300 in accordance with one embodiment.

FIG. 3 is an orthographic view of an interior surface the bead container 300 according to an example embodiment. FIG. 4 is an orthographic view of an exterior surface of the bead container 300, according to the example embodiment, this exterior surface being a second surface of the vent 100. FIG. 5 is a cross-sectional view of the bead container 300, according to the example embodiment. As shown in these figures, each of the bead holes 108 is circular in shape and has a retaining member 302 defined therein so as to retain a hydrogel bead 110 within a respective bead hole, regardless of whether the hydrogel bead 110 is in an expanded or contracted (or unexpanded) state. To this end, the retaining member 302 extends inwardly from the walls of each of the bead holes 108 as four tabs, that together define a reduced size, cross-shaped aperture 304. The dimensions of the aperture 304 are such that a hydrogel bead 110, when operatively located within one of the bead holes 108, allows a fluid to pass through the aperture 304, and between the interior walls of the bead hole and the hydrogel bead 110, while still retaining the hydrogel bead 110 within the bead hole. In one example embodiment, a ratio of the minimum dimension of the hydrogel bead 110, when in a contracted state, to a maximum lateral dimension of the aperture 304 is a 2-to-1 ratio, in order to prevent the hydrogel bead 110 from passing through the aperture 304 when under pressure from fluid passing through the passage which includes the bead hole 108.

The cross-shaped form of each aperture 304 is clearly visible from FIG. 4. This cross-shaped is advantageous in that it allows a hydrogel bead 110, when in a contracted state, to partially block the aperture 304, while concurrently allowing significant fluid flow through the aperture 304.

FIG. 5 also shows the hydrogel bead 110 within one of the bead holes 108 in a contracted state (shown in solid lines) and an expanded state (shown in broken line) in another of the bead holes 108. From this figure, it will be appreciated that a fluid is able to pass through a bead hole when the hydrogel bead 110 is in the contracted state, and that fluid is blocked from passing through a bead hole when the hydrogel bead 110 is an expanded state.

Figure 6:
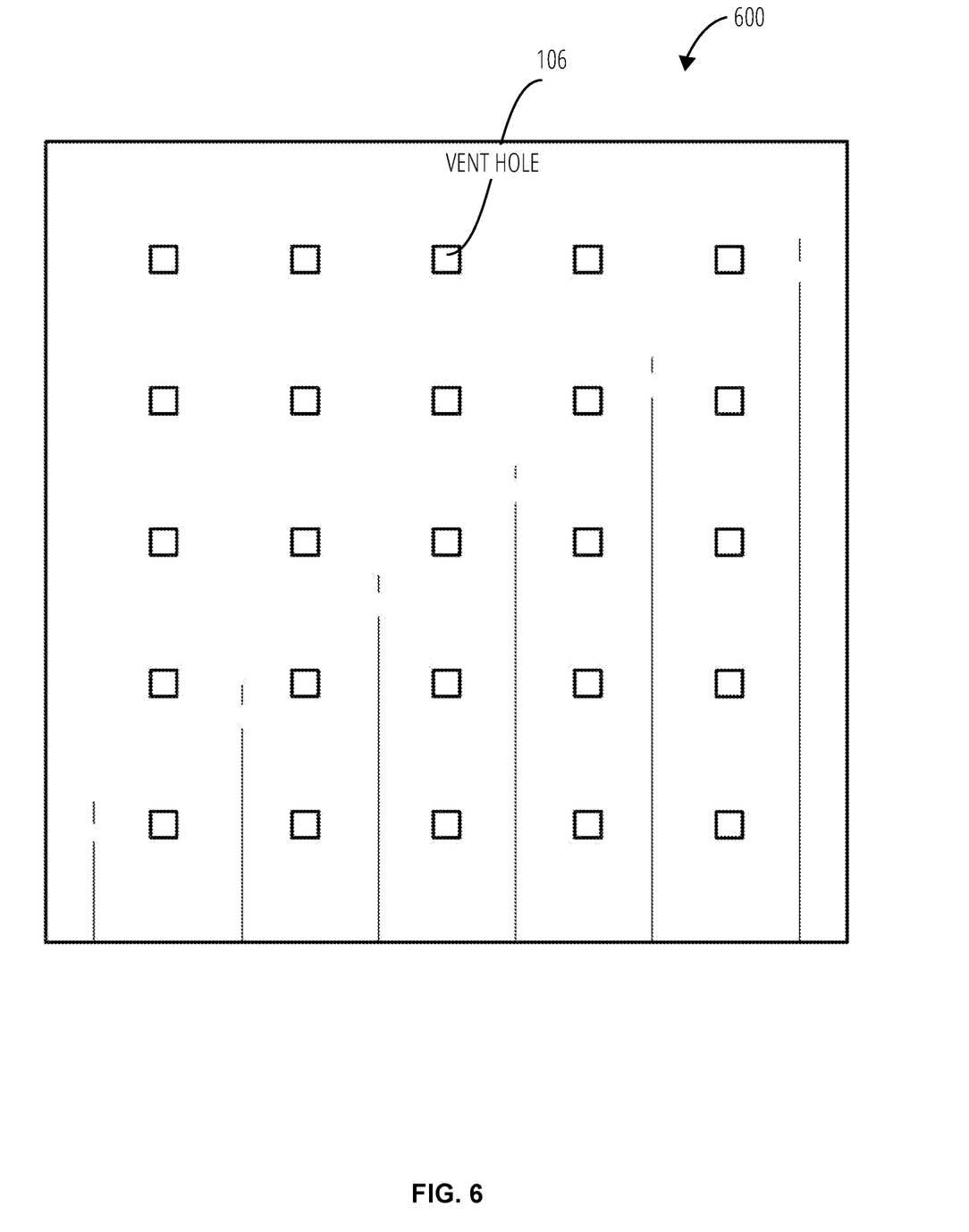
FIG. 6 illustrates a vent cover 600 in accordance with one embodiment.
Figure 7:
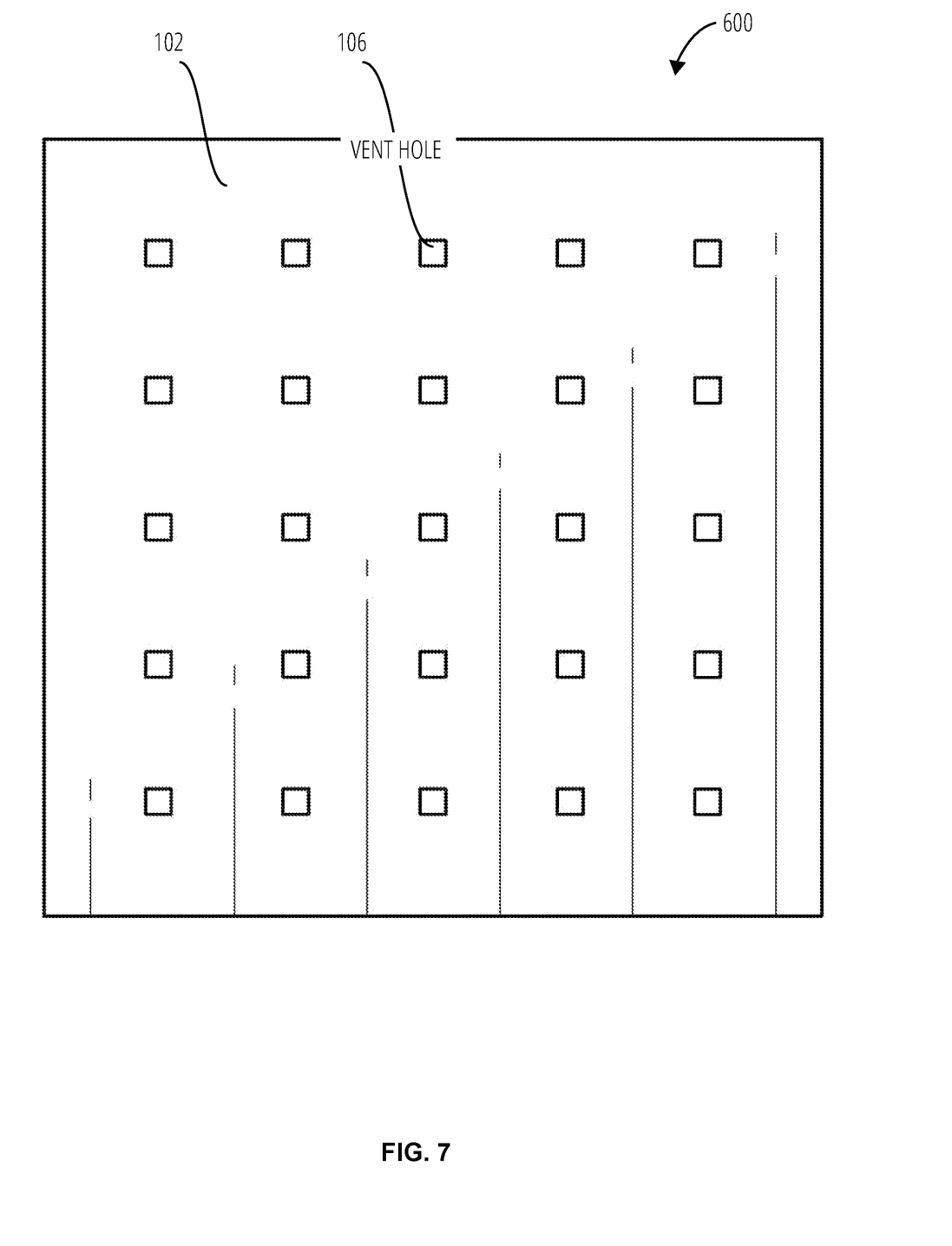
FIG. 7 illustrates a vent cover 600 in accordance with one embodiment.
Figure 8:
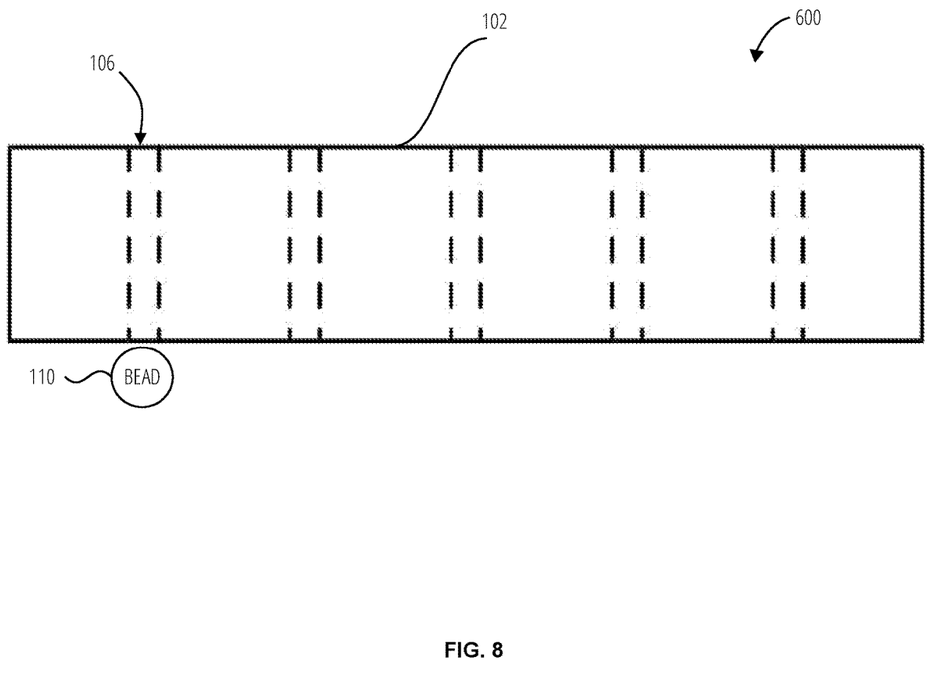
FIG. 8 illustrates a vent cover 600 in accordance with one embodiment.

FIG. 6 is an orthographic view of an interior surface of the vent cover 600, according to an example embodiment. FIG. 7 is an orthographic view of an exterior surface of the vent cover 600, according to the example embodiment, the exterior surface being a first surface of the vent 100. FIG. 8 is a cross-sectional view of the vent cover 600, according to the example embodiment. As shown in these figures, each of the vent holes 106 is square in shape and defined within the vent cover 600 to be aligned with a corresponding bead hole when the vent cover 600 is aligned with and attached to a bead container 300. Each of the vent holes 106 is further dimensioned such that it prevents a hydrogel bead 110, in the contracted state, from passing through the respective vent hole. In one example embodiment, a ratio of the minimum dimension of the hydrogel bead, when in a contracted state, to a maximum lateral dimension of a vent hole is a 2-to-1 ratio.

From the above description, it will be apparent that when the vent cover 600 is aligned with and attached to the bead container 300, a passage through the vent 100 is defined through an aligned combination of a respective vent hole with a corresponding bead hole, with a section of the passage being of sufficient lateral dimension so as to allow a fluid to pass through the defined passage when the hydrogel bead 110 is in a contracted state. Furthermore, the distal ends of the passage are dimensioned such that the hydrogel bead 110, in the contracted state, is unable to escape from the passage. The dimensions at the distal ends of the passage are defined, in one example embodiment, by the dimensions of a vent hole, and also by the retaining member defined at the end of a corresponding bead hole.

While the vent cover 600 and the bead container 300 are shown to be structurally different from each other in the above-described example embodiment, in another example embodiment, an upper bead container 300 and a lower bead container 300 may be joined to define a matrix of passages constituted by aligned bead holes define in each of these bead containers. In this embodiment, the height dimension of each of the bead containers may be a less than the height of the bead container 300 shown in FIG. 1.

In here to a further example embodiment, the structure of a retaining member 302, as defined within or adjacent a bead hole, may be different from that shown in FIG. 3 and FIG. 4. For example, instead of defining a cross-shaped aperture 304, the retaining member may be structured to define a square or circular shaped aperture (or series of apertures).

Figure 9:
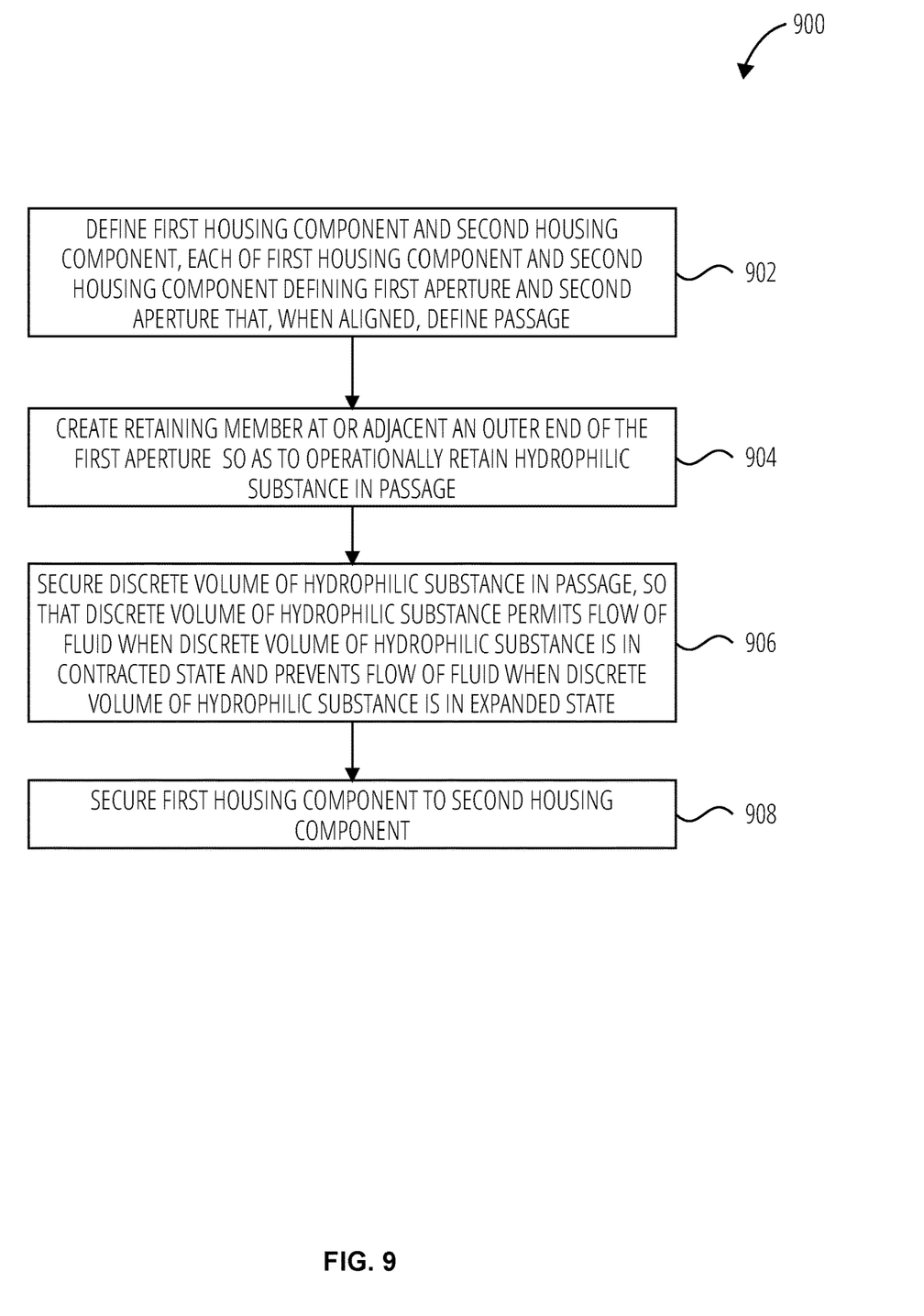
FIG. 9 illustrates a method 900 in accordance with one embodiment.

FIG. 9 is a flowchart illustrating the method 900, according to one example embodiment, to manufacture a resealable event, such as the vent 100 illustrated in FIG. 1.

The method 900 commences at operation 902, with the defining a housing that includes a mesh of passages through which a fluid can operationally flow through the housing. In one example embodiment, the housing is formed from first and second housing components in the form of the vent cover 600 and the bead container 300. Each of the first housing component and the second housing component defines a matrix of respective apertures (e.g., the vent holes 106 and the bead holes 108) that, when aligned. define a mesh or matrix of passages that extend from a first surface of the housing to a second surface of the housing.

The method 900 further includes, at operation 904, creating or defining retaining members at or adjacent the outer (or distal) end of the each of passages so as to operationally retain a hydrophilic substance within each of these passages. An example of a retaining member 302 is discussed above with reference to FIG. 3 and FIG. 5. In one embodiment, a retaining member 302 may be a mesh formation that is defined across a mouth of each of multiple bead holes 108 defined in a bead container 300.

At operation 906, a discrete volume of a hydrophilic substance (e.g., a hydrogel bead 110) is positioned within each of the passages defined within the housing. For example, a respective hydrogel bead 110 may be located within each of the bead holes 108 defined in a bead container 300. The dimensions of each hydrogel bead 110 may be such that the discrete volume of the hydrophilic substance represented by the hydrogel bead permits the flow of a fluid when the hydrogel bead is in a contracted state and prevents the flow of fluid through the corresponding passage when the hydrogel bead is in an expanded state. As such, a 2-to-1 ratio may be established between a minimum, contracted state dimension of the hydrogel bead 110, and a maximum lateral dimension of an aperture defined by the retaining member within the respective passage.

At operation 908, the first housing component is secured to the second housing component, so as to secure the hydrophilic substance (e.g., a hydrogel bead 110) within each of the matrix of passages defined through the composite housing. For example, the vent cover 600 may be glued or welded to the bead container 300 at operation 906. In a further embodiment, in which the housing is constituted by two identical bead containers, a bead container 300 may be glued to a second bead container 300 in order to create the composite housing.

The example self-sealing vent uses polyacrylamide beads to clog the only airways available in the vent. As air passes through the vent, the polyacrylamide beads absorb a significant portion of the moisture in the air making the beads expand. When sufficient air has passed through the vent, the beads expand to the point where all the holes in the bead container are clogged, and so a seal is created. An intake fan may be used to regulate the airflow through the vent. Placing in the vent in a drying oven, or any dry place allows for the water in the polyacrylamide beads to evaporate, thus shrinking the polyacrylamide beads and successfully removing the seal.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A sealable vent comprising:
   a housing comprising:
      a bead container having a plurality of bead holes disposed in a matrix configuration;
      a plurality of retaining member, each retaining member located within or adjacent to one of the plurality of bead holes; and
      a vent cover disposed on the bead container, the vent cover having a plurality of vent holes, each vent hole disposed above a respective one of the bead holes to define a discrete passage through the housing to permit a fluid to flow through the housing; and
      a plurality of beads of a hydrophilic substance, each bead hole of the plurality of bead holes holding a respective bead of the plurality of beads of the hydrophilic substance, each retaining member of the plurality of retaining members configured to retain the respective bead within a respective bead hole of the plurality of bead holes, each bead configured to operationally expand from a contracted state to an expanded state within the respective bead hole of the plurality of bead holes in order to constrict the flow of the fluid through the housing,
   wherein the flow of fluid through the housing occurs through each bead hole and around the respective bead and,
   wherein when each bead operationally expands it blocks the flow around the bead in the respective bead hole.

2. The sealable vent of claim 1, wherein the hydrophilic substance is polyacrylamide.

3. The sealable vent of claim 1, wherein dimensions of each of the plurality of vent holes of the vent cover are such so as to prevent a respective bead operationally contained in the respective one of the plurality of bead holes from escaping through the respective one of the plurality of vent holes when in either the contracted state or the expanded state.

4. The sealable vent of claim 1, wherein each bead hole is cylindrical and each corresponding retaining member is configured to define a cross-shaped aperture.

5. The sealable vent of claim 1, wherein each bead hole is cylindrical and each corresponding vent hole has a square aperture.

6. The sealable vent of claim 1, wherein a ratio, of a minimum dimension of the bead in the contracted state to a maximum lateral dimension of the vent hole, is 2-to-1.

7. The sealable vent of claim 1, wherein the bead in the expanded state is defined to block the flow of the fluid through the housing.

8. A method of manufacturing a resealable vent, the method comprising:
   locating a plurality of retaining members within or adjacent to a plurality of bead holes having a matrix configuration within a bead container;
   placing a plurality of beads of a hydrophilic substance in respective bead holes of the plurality of bead holes; and
   securing a vent cover over the bead container and the plurality of retaining member to define a housing, the vent cover having a plurality of vent holes, each vent hole disposed above a respective bead hole of the bead holes to define a discrete passage through the housing to permit a fluid to flow through the housing, each retaining member configured to retain the bead within the respective bead hole, each bead defined to operationally expand from a contracted state to an expanded state within the respective bead hole in order to constrict the flow of the fluid through the housing,
   wherein the flow of fluid through the housing occurs through each bead hole and around the respective bead and,
   wherein when each bead operationally expands it blocks the flow around the bead in the respective bead hole.

9. The method of claim 8, wherein securing the vent cover over the bead container comprises gluing the vent cover to the bead container.

10. The method of claim 8, wherein the hydrophilic substance is a hydrogel bead, and wherein the method further includes;
   structuring the bead holes, the vent holes, and the retaining members to operationally retain the respective bead, both in the contracted state and the expanded state, within the respective bead hole.

11. The method of claim 10 wherein each retaining member is a mesh formation defined across a mouth of each of the bead holes.

12. The method of claim 10, wherein the securing comprises defining dimensions of the vent hole so as to operationally retain the bead within the housing when the bead is in the contracted state.

* * * * *